(12) United States Patent
Ding (10) Patent No.: US 6,427,102 B1
(45) Date of Patent: Jul. 30, 2002

(54) METHOD AND DEVICE FOR SENSOR MONITORING, ESPECIALLY FOR ESP SYSTEM FOR MOTOR VEHICLES

(75) Inventor: Eve Limin Ding, Senftenberg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/890,531

(22) PCT Filed: Jan. 25, 2000

(86) PCT No.: PCT/EP00/00538

§ 371 (c)(1),
(2), (4) Date: Aug. 1, 2001

(87) PCT Pub. No.: WO00/46087

PCT Pub. Date: Aug. 10, 2000

(30) Foreign Application Priority Data

| Feb. 1, 1999 | (DE) | 199 03 934 |
| Jun. 25, 1999 | (DE) | 199 29 551 |
| Aug. 24, 1999 | (DE) | 199 39 872 |

(51) Int. Cl.⁷ .............................................. G06F 19/00
(52) U.S. Cl. ........................................ 701/34; 701/35
(58) Field of Search .............................. 701/34, 29, 33, 701/32, 35, 76, 99, 101; 702/34, 185, 183

(56) References Cited

U.S. PATENT DOCUMENTS

| 5,809,444 A | | 9/1998 | Schuh et al. | |
| 6,240,343 B1 | * | 5/2001 | Sarangapani et al. | 701/29 |
| 6,314,375 B1 | * | 11/2001 | Sasaki et al. | 702/34 |
| 6,338,010 B1 | * | 1/2002 | Sparks et al. | 701/33 |
| 6,339,737 B1 | * | 1/2002 | Yoshimura et al. | 701/34 |
| 6,347,267 B1 | * | 2/2002 | Murakami | 701/35 |

FOREIGN PATENT DOCUMENTS

| DE | 42 26 082 | 2/1994 |
| DE | 42 27 113 | 4/1994 |
| DE | 197 06 752 | 8/1997 |
| DE | 196 07 429 | 9/1997 |
| DE | 196 23 596 | 12/1997 |
| DE | 197 21 299 | 12/1997 |

OTHER PUBLICATIONS

Search Report of the German Patent Office for Application No. 199 39 872.0.
Dorr et al.: "Detection, Isolation, and Identification of Sensor Faults in Nuclear Power Plants"; IEEE Transactions on Control Systems Technology vol. 5, No. 1; New York (1997) p. 42–60.
Isermann: "Modellgestützte Überwachung und Fehlerdiagnose Technischer Systeme" (Part 1); atp—Automatisierungstechnische Praxis vol. 38, No. 5; (1996) p. 9–20.
Schuler: "Methoden der Prozessfühurng mit Simulationsmodellen"; apt—Automatisierungstechnische Praxis vol. 31, No. 10; (1989) p. 475–481.

\* cited by examiner

*Primary Examiner*—Richard M. Camby
(74) *Attorney, Agent, or Firm*—Rader, Fishman & Grauer PLLC (57) ABSTRACT

The present invention relates to a method and a device for monitoring sensors that sense in each case individual reference variables or measured variables (A, B, C) relating to a process (32), which are especially suited for an electronic stability program (ESP) for vehicles. A particularly high degree of reliability is achieved by monitoring the course of the output signals of the individual sensors in a cyclical and sequential fashion in that analytical redundancies are produced from process reference variables and process measured variables (A, B) which are currently not being monitored by means of a multi-process model (31) for a normal operational mode, and a residuum (33) is formed of the redundancies along with the output signal being currently monitored. After evaluation of the residuum (36) and comparison with a threshold value (35), a fault signal (F) is generated when the residuum reaches the threshold value.

9 Claims, 5 Drawing Sheets

METHOD AND DEVICE FOR SENSOR MONITORING, ESPECIALLY FOR ESP SYSTEM FOR MOTOR VEHICLES

TECHNICAL FIELD

The present invention generally relates to a system for monitoring sensors and more particularly relates to a method and a device for monitoring sensors which sense in each case individual reference variables or measured variables relating to a process.

BACKGROUND OF THE INVENTION

Electronic stability programs of this general type are driving-dynamics control systems for vehicles which are used to assist the driver in critical driving situations during braking, accelerating, and steering, and to intervene where the driver has no direct intervention possibility. The control system assists the driver when braking, especially on a roadway with a low or varying coefficient of friction, on which the vehicle might be no longer controllable due to locking wheels. The system also assists in accelerating, in instances when there is a high risk of spinning of the driven wheels, and also assists in steering the vehicle during cornering, where the vehicle might oversteer or understeer. In total, ESP's not only improve vehicle response but also improve vehicle safety.

A control system of this type is based on a closed-loop control circuit which, during normal operation of the vehicle, uses standard vehicle control systems to stabilize the vehicle as quickly as possible in extreme driving situations. Sensors used to detect the various driving-dynamics parameters are of special importance as generators of actual values. The precondition for proper control is that the sensors correctly represent the actual condition of the controlled system. This is particularly important in driving stability control operations initiated in extreme driving situations, where a control deviation must be adjusted by the ESP control within a very short time. This is the reason why the ESP sensors (yaw rate sensor, transverse acceleration sensor, steering angle sensor) of an electronic stability program require constant monitoring. The purpose of a corresponding on-line sensor monitoring system is to quickly detect faults in the ESP sensors in order to rule out a faulty control maneuvers which might cause a vehicle condition that is critical in terms of safety.

In view of the above, an object of the present invention is to provide a method and a device for monitoring the output signal of sensors of the above-mentioned type offering the reliability which is imperative especially for an electronic stability program (ESP) for vehicles.

This object is achieved by monitoring the course of the output signals of the individual sensors in a cyclical and sequential manner, comprising the following steps: producing analytical redundancies for a process reference variable or process measured variable being currently monitored from process reference variables and/or process measured variables of a current process, which said variables are not being monitored currently, on the basis of a multi-process model for a normal operational mode, producing residua by subtraction of the produced redundant analytical redundancies from the currently monitored process reference variable or process measured variable, evaluating the residua by means of a residua evaluating function and comparing the evaluated residuum with a predetermined threshold value and producing a fault message when the residuum reaches the threshold value for at least one predetermined monitoring time.

Further, this object is achieved by a first device for calculating analytical redundancies for a currently monitored process reference variable or process measured variable from currently not monitored process reference variables and/or process measured variables of a current process by means of a multi-process model for a normal operational mode, a second device for producing residua by subtraction of the calculated redundant analytical redundancies from the currently monitored process reference variable or process measured variable, a third device for evaluating the residua with a residua evaluating function, a fourth device for producing a threshold value, as well as a fifth device for comparing the evaluated residuum with the threshold value and for producing a fault message when the residuum reaches the threshold value for at least one predetermined monitoring time.

BRIEF DESCRIPTION OF THE DRAWINGS

FIGS. 6a, b, c represent an illustration of the measurement results in a fault simulation.

FIGS. 7a, b, c represent an illustration of the measurement results in a slalom maneuver.

DETAILED DESCRIPTION OF THE PREFERRED EMBODIMENTS

Figure 1:
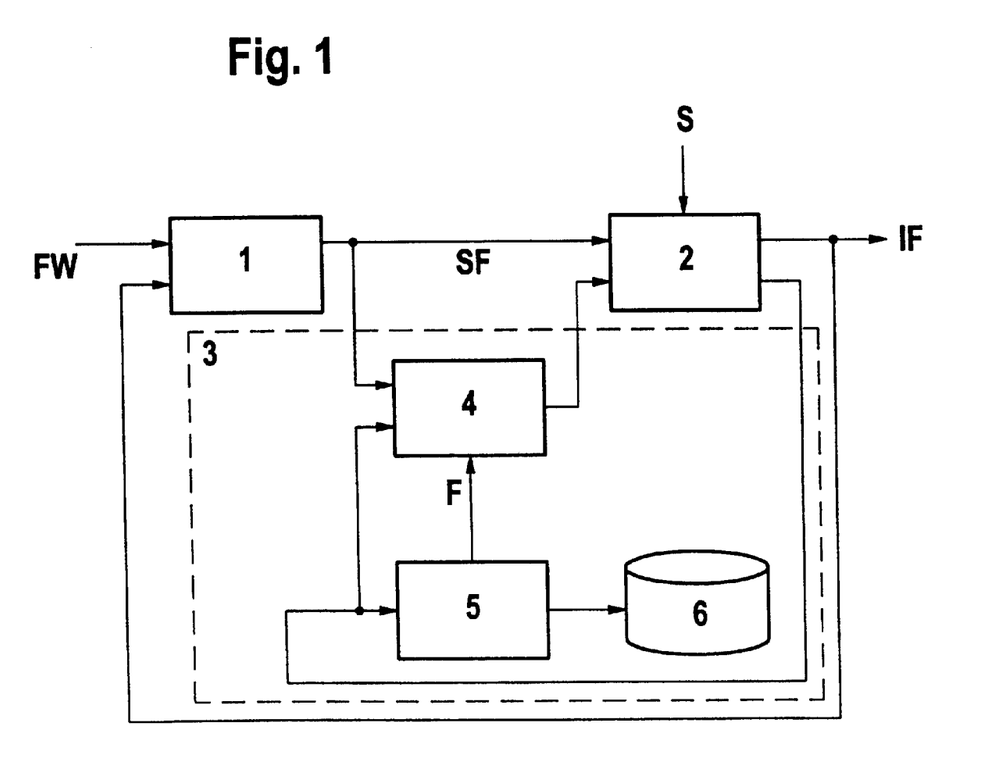
FIG. 1 is a block diagram of a driving-dynamics control system.

According to FIG. 1, the action of driving a car can be considered as a control circuit in terms of control technology wherein a driver 1 represents the controller and a vehicle 2 represents the controlled system. In this arrangement, the reference variables are the personal driving requests FW of the driver which he/she produces by constantly monitoring the road traffic. The actual values IF are the instantaneous values for the driving direction and the speed which the driver acquires by way of his/her eyes or the driving feeling. The correcting variables SF are the steering-wheel angle, the position of the transmission, and the positions of the accelerator pedal and brake pedal which are provided by the driver based on the discrepancies between the nominal and the actual values.

A control of this type is frequently impaired by disturbances S such as variations in the coefficient of friction, roadway irregularities, cross wind, or other influences because the driver cannot measure these factors precisely, but must consider them in the control. Therefore, the driver 1 is generally able to handle the tasks of controlling and monitoring the process of driving a car in normal driving conditions with the aid of his/her training and all experiences acquired without difficulties. However, in extreme situations and/or in the presence of the mentioned extraordinary driving conditions where the physical limits of the frictional force between the roadway and the tires are exceeded, there is the risk that the driver will react too late or wrongly and lose control over the vehicle.

To be able to take also these driving situations into account, the driving-dynamics control system is supplemented by a subordinate control circuit 3 (ESP) which comprises a control algorithm 4, a system monitoring arrangement 5, and a fault memory 6. Measured driving condition variables are sent to the system monitoring arrangement 5 and the control algorithm 4. If necessary, the system monitoring arrangement 5 will produce a fault message F which is forwarded to the fault memory 6 and the control algorithm 4. The control algorithm 4 will then act upon the vehicle 2 as a function of the correcting variables produced by the driver 1. Typical control tasks are executed by this control circuit. The vehicle is stabilized as quickly as possible in extreme driving situations.

Figure 2:
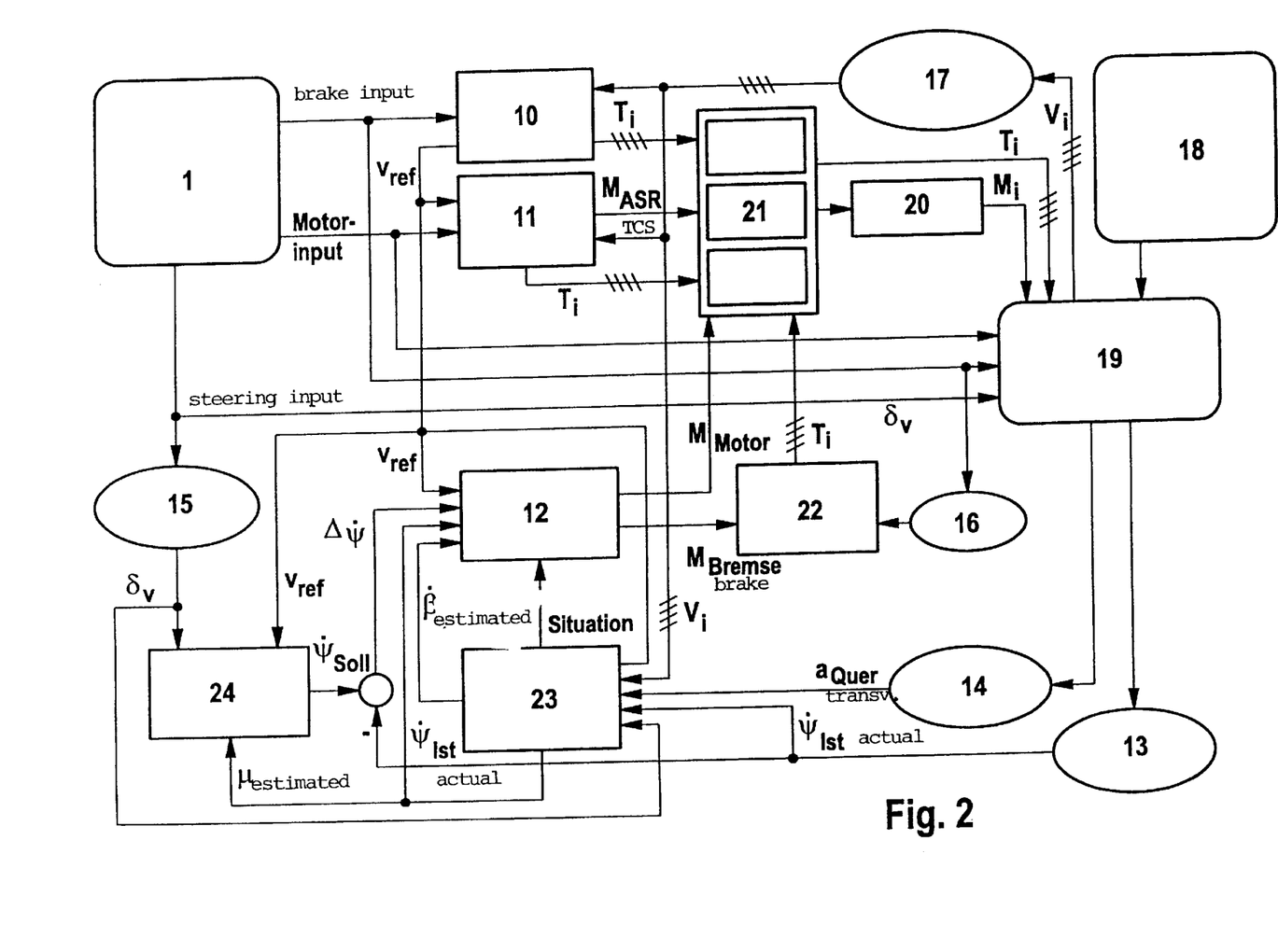
FIG. 2 is a schematic view of the structure of an ESP system.

FIG. 2 shows the structure of a control circuit of this type which generally comprises an anti-lock system 10, a traction slip control system 11, and a yaw torque control system 12.

Further, there is provision of a yaw rate sensor 13, a transverse acceleration sensor 14, a steering angle sensor 15, a pressure sensor 16, and four wheel speed sensors 17 which are used both as actual value generators for determining the deviation and for producing a yaw rate nominal value and various intermediate values.

The process reference variables which are generated by the driver 1 by actuating an accelerator pedal and brake pedal and the steering wheel are sent to the traction slip control system 11, the anti-lock system 10, and the pressure sensor 16 and/or steering angle sensor 15. Vehicle-related non-linearities, variations in the coefficients of friction, cross wind influences, etc., are summarized as disturbances or unknown quantities 18 and influence the vehicle longitudinal and transverse dynamics 19. Dynamics 19 is further influenced by the mentioned reference variables and the output signals of an engine management unit 20 and acts upon the wheel speed sensors 17, the yaw rate sensor 13, the transverse acceleration sensor 14, and the pressure sensor 16. A control arbitration 21 which is supplied with the output signals of the anti-lock system 10, the traction slip control system 11, the yaw torque control system 12, and a brake intervention algorithm 22 is used for the priority distribution of these signals with respect to their action on the engine management unit 20 or directly on the driving dynamics 19. The brake intervention algorithm 22 is influenced by the yaw torque control system 12 and the pressure sensor 16. Further, there is provision of a driving condition detection unit 23 to which are sent the signals of the steering angle sensor 15, the yaw rate sensor 13, the transverse acceleration sensor 14, and the wheel speed sensors 17, and the output signals of unit 23 take effect on the yaw torque control system 12 and a single-track reference model 24 by which a desired nominal yaw rate is generated.

As has already been explained above, a wrong sensor signal can cause a dangerous unplausible control. Failure of the yaw rate sensor 13 may e.g. have as a result that an additional yaw torque will suddenly pull the vehicle sideways although the driver wants to drive straight ahead. This is due to the fact that during straight travel the steering angle and, hence, the nominal value of the yaw rate is equal to zero, however, the actual value of the yaw rate because of the sensor failure has an undefined value so that the yaw torque control system 12 produces an additional yaw torque for adjusting this deviation. On-line monitoring of the sensors is very important for this reason. This monitoring must be able to detect sensor failure at such an early point of time that the ESP system can be deactivated in due time, either in part or in full.

The sensor monitoring concept of the present invention is composed of a multi-step functionality test of the sensors in which two methods are used. On the one hand, electric monitoring is performed by which it is checked whether the sensor signals being monitored lie within their allowable fault bands. On the other hand, an analytically redundantly based monitoring is performed by which the signals are monitored in their overall useful ranges.

In a first step, the sensor supply voltage and cabling is tested by the electrical monitoring arrangement. In a second step, such sensors which are constructed 'intelligently' due to their importance constantly undergo self-testing. When an internal sensor failure occurs, the sensor signal will pass into the fault band. Consequently, such sensor failures can also be detected by the electrical monitoring operation.

Figure 3:
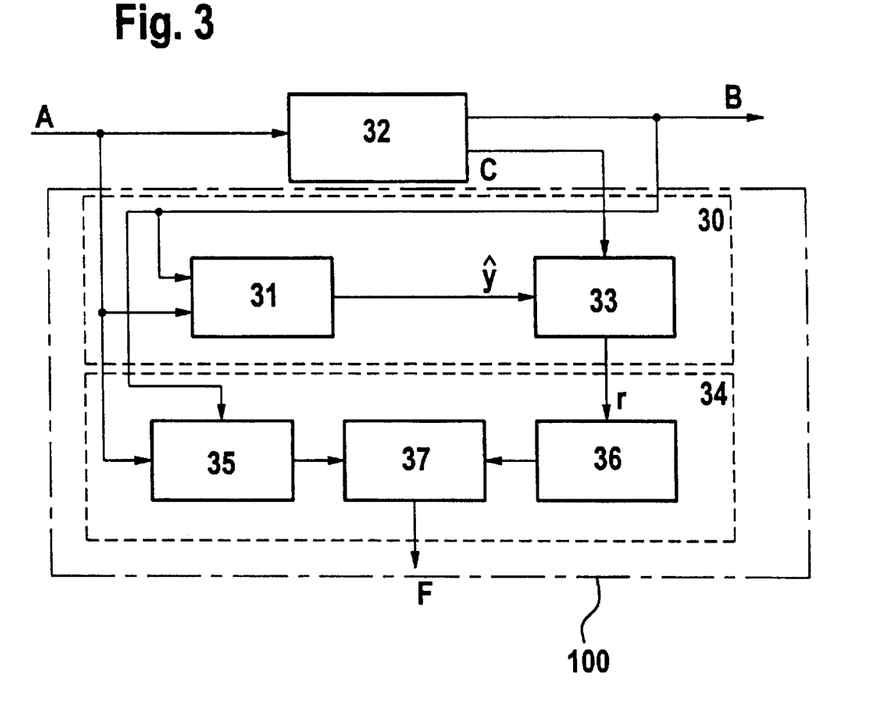
FIG. 3 is the basic principle of a fault diagnosis system.

It is exclusively checked by the electrical monitoring whether the sensor signals are in their validity ranges. Detecting other sensor faults such as a wrong or loosened installation position, ground interruption, etc., however, is not possible in the monitoring. For this reason, the courses of the individual sensor signals in their useful ranges are monitored in a cyclical and sequential fashion in a third step, namely by means of analytical redundancies which are calculated from the sensor output signals currently not monitored on the basis of their physical dependencies. To this end, a model-based ESP monitoring and fault diagnosis system is provided, the basic structure of which is illustrated in FIG. 3.

The fault diagnosis system 100 is basically composed of two parts, i.e., a residua generator 30 and a residua evaluating unit 34.

The residua generator 30 comprises a first device 31 for calculating analytic redundancies from process reference variables A and/or the process measured variables B currently not being monitored which are produced by a currently occurring process 32 and currently non-monitored process measured variables B, and namely for a currently monitored process reference variable or process measured variable C by using a multi-process model (G1–G4; Q1–Q4; L1–L4, see below) for a normal operational mode. Further, a second device 33 is provided for producing residua r by subtraction of the calculated redundant analytical redundancies from the currently monitored process reference variable or process measured variable C.

The residua evaluating unit 34 comprises a third device 36 for evaluating the residua r with a residua evaluating function, and a fourth device 35 for producing a threshold value. The process reference variables and/or process measured variables A, B currently not being monitored are also sent to this device 35 in order to increase the threshold value at a relatively high rate of inaccuracy of the multi-process model and to decrease it at a relatively low rate of inaccuracy of the model. Also, there is provision of a fifth device 37 for comparing the evaluated residuum with the threshold value and for producing a fault message F when the residuum reaches the threshold value for at least one predetermined monitoring time.

To illustrate the problems underlying the present invention and to comprehend the solution of this invention which is shown in general in FIG. 3, first of all, the following background information will be given:

With the use of only one single process model (instead of a multi-process model) for the generation of residua, it is already possible to acquire information about the current process condition and, hence, also about possible malfunctions. However, the efficiency greatly depends on the quality of the process model employed. With rising inaccuracies of the process model, it is necessary to increase the threshold value in order to prevent a spurious alarm. In turn, the result is that a number of faults stay unnoticed. When, in contrast thereto, attempts are made to increase the accuracy of the process model, which simultaneously means an increase in the model complexity, one will frequently fail in practical operations in the high costs incurred with the implementation of the model in the on-line calculation and the high demand placed on development and maintenance. Consequently, a compromise between the model accuracy and the adjustment of the threshold values and, thus, the system sensitivity will play a major role in the development of a model-based ESP fault diagnosis system.

It must also be taken into account that the process of driving a car is known to be greatly influenced by many still unknown environmental factors. In addition, driving dynamics can be described mathematically only to a certain degree. On the other hand, the limits of implementability are defined from the very beginning by the hardware condition. All these marginal conditions require a solution which, admittedly, is based on the principle of model-based methods, the employment of which in an ESP system must be justified though.

The basic idea of the model-based fault diagnosis is the examination of physical interrelationships which are illustrated in the form of a mathematical model. It shall be assumed that $$y=f(u_1, \ldots, u_m) \qquad \text{[equation 1]}$$

describes one of these physical interrelationships, wherein y refers to the output signal of the sensor being monitored, $u_1$, ..., $u_m$ represents the known or measured physical quantities, and $f$ represents a mathematical function. In this case, the analytical redundancy ŷ is formed of $$ŷ=f(u_1, \ldots, u_m)$$

and the residuum r is produced as follows:

$$r=y-ŷ$$

The residuum is generally equal to zero in the faultfree case. When a sensor failure occurs, this regularity will no longer be valid so that the residuum significantly differs from zero. The difficulty in realizing this idea is that the model describes the process only in part. This so-called model inaccuracy can be expressed by an extension of the process model to $$y=f(u_1, \ldots, u_m)+\Delta$$

wherein $\Delta$ is an unknown quantity which depends on the process condition. It is the precondition of a reliable model-based fault diagnosis that the influence of $\Delta$ on the residuum r is kept as minimal as possible.

Principally, there are two ways of suppressing the influence of $\Delta$:

1. Increasing the robustness of the monitoring system by applying modem robust control theories: this is a passive way which generally necessitates a sophisticated draft and an increased calculating complexity (both off-line and on-line).
2. Acquiring additional information: this is an active way which can be realized in two fashions, namely, on the one hand, by improving the model which implies obtaining the off-line information but, additionally, also means an additional on-line calculating complexity, and, on the other hand, by utilizing additional on-line information. This way has proven particularly favorable to reach the solution of the mentioned problems according to the present invention.

The use of the additional on-line information permits producing a multiple (redundant) model for a sensor being monitored and, further, reconstructing the behavior and the functionality of this sensor, and namely by way of the signals of different sensors or signal sources not being monitored. On the one hand, this redundant analytical redundancy enhances the reliability of the monitoring system, on the other hand, also the robustness with respect to model inaccuracies. One preferred embodiment of the method of the present invention, by which this basic idea can be realized, will be presented in the following.

It shall be assumed that a model can be produced for the behavior of a sensor signal being monitored with the following equation system $$y=f_1(u_{11}, \ldots, u_{1m})+\Delta_1, PZ \in GB_1$$

$$\ldots$$

$$\ldots$$

$$\ldots$$

$$y=f_n(u_{n1}, \ldots, u_{nm})+\Delta_n, PZ \in GB_n$$

wherein $u_{ij}$, i=1, ..., n; j=1, ..., m designate signals from different sources and $f_1, \ldots, f_n$ refer to partial models, $\Delta_1, \ldots \Delta_n$ refer to model inaccuracies of the individual partial models, PZ relates to the process condition and $GB_i$, i=1, ..., n relates to the range for which the partial model applies.

The validity and the model inaccuracy of the individual partial models depends on the process condition. The problem is now directed to producing a residuum by way of the multi-process model which is sensitive with respect to the faults being detected, on the one hand, and robust with respect to model inaccuracies, on the other hand.

Driving situations are subdivided into two groups to this end:

1. instationary driving behaviors where the model inaccuracy is very distinct and only a small number of partial models is valid, and
2. stationary driving behaviors having the common characteristic that the majority of partial models is valid and that the model inaccuracy is low.

ad 1.: stationary driving behaviors: because the absolute value of the residuum is used as a residua evaluating function, the residuum r $$|r| = |y - ŷ_i| = |y - f_i(u_{i1}, \ldots, u_{im})| \qquad \text{[equation 2]}$$

$$= \min_i \{|y - f_i(u_{i1}, \ldots, u_{im})|, i = 1, \ldots, n\}$$

of all possible residua is the result as being most robust vis-à-vis model inaccuracies and, simultaneously, as being least susceptible to faults. Thus, it is determined for this driving situation:

When the number of the valid partial models is considerably smaller than a predetermined number (<<n), the residuum will be evaluated according to the principle of [equation 2].

We call this rule "minimum of all", the basic idea of which implies that the robustness is weighted to an increased extent in the instationary range where the model inaccuracy is very distinct.

Ad 2): stationary driving behavior: when there is $$PZ \in GB_1 \cap GB_2 \cap, \ldots, \cap GB_n$$

which means that all or almost all partial models are valid and, thus, there is a normal process condition in general, the residuum will be chosen with the following algorithm:
Step 1: production of the mean value $\bar{y}$ $$\bar{y} = \frac{1}{n+1}\left(\sum_{i=1}^{n} \hat{y}_i + \hat{y}_{i+1}\right), \hat{y}_{i+1} = y$$

Step 2: calculation of $|\bar{y}-\hat{y}_i|$, i=1, ..., n+1 and selection of $\hat{y}_{i1}$, $\hat{y}_{i2}$, $\hat{y}_{i3}$, which have the lowest deviations of $\bar{y}$, i.e., $$|\bar{y}-\hat{y}_{i1}|, |\bar{y}-\hat{y}_{i2}|, |\bar{y}-\hat{y}_{i3}| < |\bar{y}-\hat{y}_j|, j \neq i_1, i_2, i_3,$$

$j \in \{1, \ldots, n+1\}$
Step 3: production of the residuum r:
It shall be assumed that $\hat{y}_{i1} \leq \hat{y}_{i2} \leq \hat{y}_{i3}$ applies, the $$r = y - \hat{y}_{i2}.$$

In order to explain the function principle of this algorithm, we consider two cases:
a.) failfree operation: in this case, there applies for the "best case":

$$\hat{y}_{i2} = y \to r = y - y = 0$$

This means that the model inaccuracy has no effect on the residuum. For the "worst case", there applies:

$$y \notin \{\hat{y}_{i1}, \hat{y}_{i2}, \hat{y}_{i3}\} \to r = y - \hat{y}_{i2}$$

The maximum possible deviation can be limited according to the following equation $$|y-\hat{y}_{i2}| = |y-\bar{y}+\bar{y}-\hat{y}_{i2}| \leq |y-\bar{y}| + |\bar{y}-\hat{y}_{i2}| \leq 2|y-\bar{y}|.$$

Because the production of the mean value suppresses the model inaccuracy in the most cases, also the deviation caused by the model inaccuracy is minimized.
b.) sensor fault: in this case, there applies for the "normal case":

$$y \notin \{\hat{y}_{i1}, \hat{y}_{i2}, \hat{y}_{i3}\} \to r = y - \hat{y}_{i2} \neq 0$$

The sensor signal y will differ greatly from its normal value and, thus, also from $y_{ik}$, k=1, 2, 3 due to the fault. In consequence thereof, there is a great difference between y and $y_{i2}$. For the "worst case" applies:

$$\hat{y}_{i2} = y \to r = y - y = 0$$

This means that the fault is not detectable. However, this case can only occur when the magnitude of the fault is in the range of the model inaccuracy. This also shows that the limit of capacity of the monitoring concept is substantially determined by the model inaccuracy.

As has already been explained, the concept of the residua generation preconditions a test of the model validity. This comprises testing the reliability of the signals which shall be used for the generation of residua and testing the model validity corresponding to the driving situation.

A signal is referred to as reliable when it has been checked in terms of software or hardware. The reliable signals can either be signals from the other partial functions of the systems or signals from the other sensors which means a mutual monitoring. This is the on-line information that is used for the production of the multi-process model.

As has already been shown, the residuum produced greatly depends on the model inaccuracy which, in turn, can be influenced by different driving situations. It is therefore desirable to develop a residua evaluating unit which conforms adaptively to the driving situations.

As is generally known, the driving behavior during stationary travel can be described very accurately. In contrast thereto, it is very difficult to reproduce mathematically a highly dynamic driving maneuver. It is therefore favorable to distinguish between driving situations from case to case and to adaptively adjust the monitoring thresholds and times on this basis. The adaption of the monitoring thresholds is meant to cause triggering in due time a fault message when an unplausible sensor signal appears, on the one hand, and preventing spurious fault messages which may be caused by the inaccuracy of the reproduction, on the other hand. This means that in a driving situation in which there is low accuracy of the sensor signal reproduction, the threshold must be adjusted to be high and the monitoring time to be long, while in the other case the threshold must be lowered and the monitoring time shortened.

Hereinbelow follows the description of how to realize the concept of monitoring the three important ESP sensors, i.e., yaw rate sensor, transverse acceleration sensor, and steering wheel sensor, as presented in the last paragraph.

Figure 4:
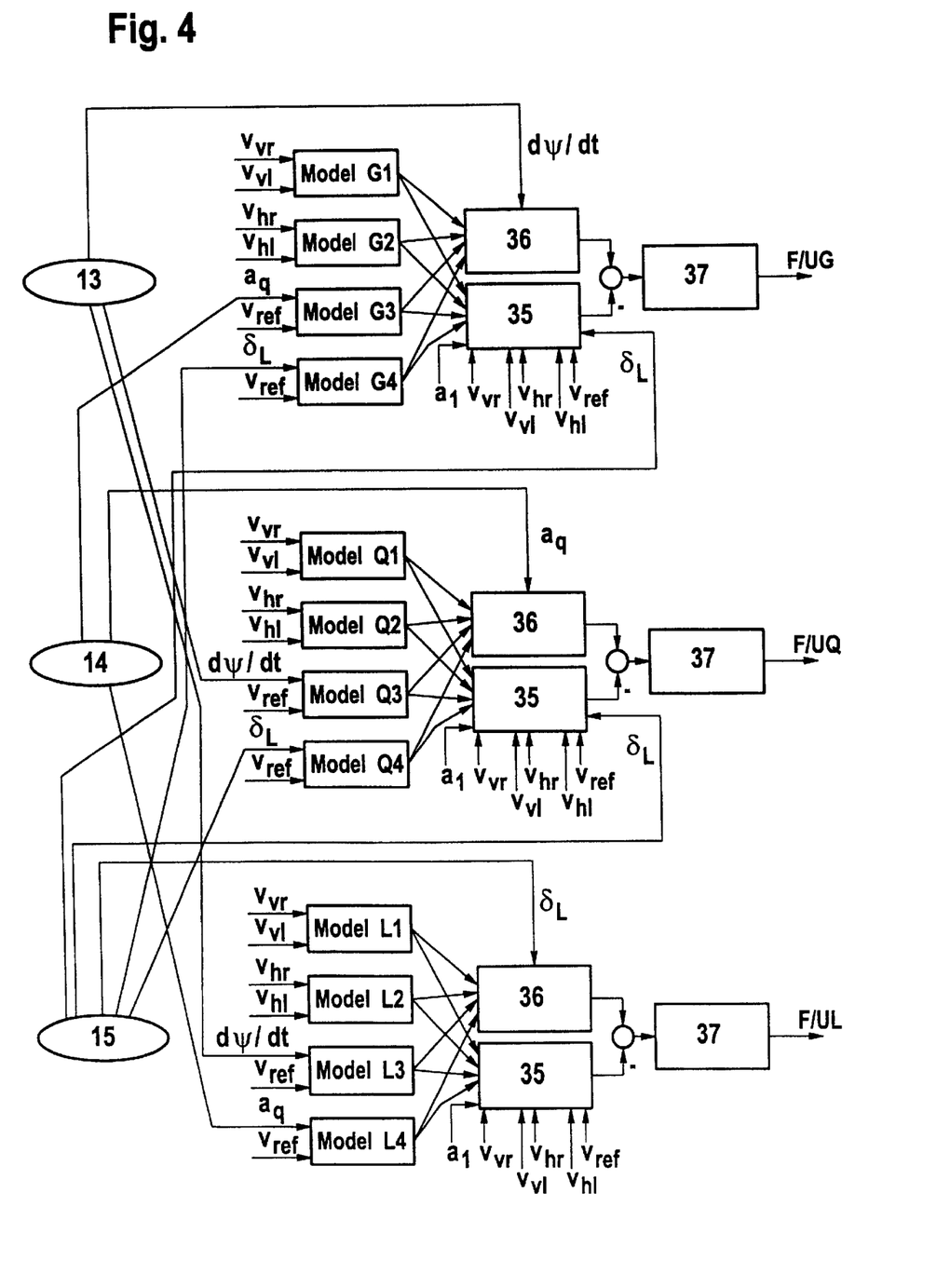
FIG. 4 is a structure of a model-based monitoring system for the ESP sensors.

FIG. 4 shows the structure of the model-based monitoring system for the ESP sensors, i.e., a yaw rate sensor 13, a transverse acceleration sensor 14, and a steering angle sensor 15. For the monitoring of each ESP sensor, four redundant models are available, as long as they are valid. These models are the models G1 to G4 for the yaw rate sensor 13, the models Q1 to Q4 for the transverse acceleration sensor 14, and the models L1 to L4 for the steering angle sensor 15. The mathematical realization of the process models and their validity is comprised in table 1. The symbols used in the table have the following definition:

$\dot{\psi}_m$—model yaw rate, $a_{qm}$—model transverse acceleration, $\delta_{Lm}$—model steering wheel angle, $\dot{\psi}$—yaw rate, $a_q$—transverse acceleration, $\delta_L$—steering wheel angle, $i_L$—steering ratio, l—wheelbase, S—track width of the vehicle, $V_{ch}$—characteristic driving speed.

TABLE 1

| table 1 | equations | validity conditions |
|---|---|---|
| model G1 | $\dot{\psi}_m = \frac{v_{vr} - v_{vl}}{S}$ | The two front wheels are not subjected to slip, their fault flags are not set, and the reproduction is in the valid range. |
| model G2 | $\dot{\psi}_m = \frac{v_{hr} - v_{hl}}{S}$ | The two rear wheels are not subjected to slip, their fault flags are not set, and the reproduction is in the valid range. |
| model G3 | $\dot{\psi}_m = \frac{a_q}{v_{ref}}$ | The driving speed must be in excess of zero. |

TABLE 1-continued

| table 1 | equations | validity conditions |
|---|---|---|
| model G4 | $\dot{\psi}_m = \dfrac{\delta_L}{i_L l} \dfrac{v_{ref}}{\left(1+\left(\frac{v_{ref}}{v_{ch}}\right)^2\right)}$ | no countersteering, no significant steering at high vehicle speeds. |
| model Q1 | $\alpha_{q_m} = v_{ref} v_{vr} - \dfrac{v_{vl}}{S}$ | see conditions of model G1 |
| model Q2 | $\alpha_{q_m} = v_{ref} \dfrac{v_{hr} - v_{hl}}{S}$ | see conditions of model G2 |
| model Q3 | $\alpha_{q_m} = v_{ref} \dot{\psi}$ | — |
| model Q4 | $\alpha_{q_m} = \dfrac{\delta_L}{i_L l} \dfrac{v_{ref}^2}{\left(1+\left(\frac{v_{ref}}{v_{ch}}\right)^2\right)}$ | — |
| model L1 | $\delta_{L_m} = \dfrac{i_L l}{v_{ref}} \left(1+\left(\frac{v_{ref}}{v_{ch}}\right)^2\right)\left(\dfrac{v_{vr}-v_{vl}}{S}\right)$ | see conditions of models G1 and G3 |
| model L2 | $\delta_{L_m} = \dfrac{i_L l}{v_{ref}} \left(1+\left(\frac{v_{ref}}{v_{ch}}\right)^2\right)\left(\dfrac{v_{hr}-v_{hl}}{S}\right)$ | see conditions of models G2 and G3 |
| model L3 | $\delta_{L_m} = \dfrac{i_L l}{v_{ref}} \left(1+\left(\frac{v_{ref}}{v_{ch}}\right)^2\right) \dot{\psi}$ | see conditions of model G3 |
| model L4 | $\delta_{L_m} = \dfrac{i_L l}{v_{ref}^2} \left(1+\left(\frac{v_{ref}}{v_{ch}}\right)^2\right) \alpha_q$ | see conditions of model G3 |

The models are implemented into the first device 31, and the following signals can be employed as input quantities to calculate the redundancies and, thus, to detetrine the residua:

$v_{vr}$—wheel speed front right,
$v_{vl}$—Wheel speed front left,
$v_{hr}$—Wheel speed rear right,
$v_{hl}$—wheel speed rear left, and
$v_{ref}$—vehicle speed, which are produced with the partial function of the anti-lock system, as well as the yaw rate, the transverse acceleration, and the steering angle, which originate from the three ESP sensors 13, 14, and/or 15. The calculated redundancies, along with the sensor signal being respectively monitored, are applied to the third device 36 for the generation and evaluation of residua (which also comprises the second device 33 in this representation). After the differentiation between the respective residuum and the threshold value produced by the fourth device 35, the fifth device 37 will be used to generate the fault message F/UG for the yaw rate sensor 13, F/UQ for the transverse acceleration sensor 14, or F/UL for the steering angle sensor 15 when the difference exceeds a defined value. The third, fourth, and fifth device 36, 35, 37 for each sensor 13, 14, 15 is illustrated separately in FIG. 4.

Testing the reliability of the signals generated by means of the anti-lock system is effected by the monitoring system existing therein. The signals are assessed as reliable in the absence of a fault message and as not applicable in the event of a fault message.

In case of the three above-mentioned ESP sensor signals (yaw rate, transverse acceleration, steering angle) with respect to the sensor monitoring system described herein, the respective signal is assessed as reliable in the absence of a fault message, and the system is deactivated when a fault message appears.

As mentioned hereinabove, the method 'majority principle' is sensitive to a sensor fault when a sensor is defective, while the method 'minimum of all' is more robust in terms of a system malfunction and a transient or extreme driving behavior. The monitoring concept referred to in the last paragraph is realized as follows:

When the number of the valid models is smaller than three, the residuum is produced according to the principle 'minimum of all'. In all other respects the residuum is produced according to the 'majority principle'.

Theoretically, all these process models apply only in the stationary or linear range of driving dynamics. When the driving behaviors no longer lie in this range, the monitoring thresholds must be increased and the monitoring times extended. This is effected by a situation detection in the fourth device (threshold value calculation) 35 and a determination of the grade of deviation of the driving behavior from the stationary or linear range (cf. FIG. 4). The signals used for this purpose are: the vehicle speed $v_{ref}$, the four wheel speeds $v_{vr}$, $v_{vl}$, $v_{hl}$, $v_{hr}$, the vehicle longitudinal acceleration $a_1$ which also ensues from the partial function ABS and is examined therein, as well as the calculated redundancies and the other ESP sensor signals.

These monitoring thresholds and times are established or determined by investigations of the vehicle behavior in the presence of different types of faults in different driving situations. When a variation of the yaw rate sensor signal with a great gradient is detected which relates to none of the possible driving maneuvers, the monitoring time is shortened considerably.

The adaption of the monitoring thresholds and times is summarized in table 2 in a simplified form:

TABLE 2

Monitoring Thresholds and Times

| | | | monitoring time | |
|---|---|---|---|---|
| driving situation | accuracy of the process models | monitoring threshold | fault with a high gradient | other |
| stationary travels: straight travel and stationary circular travel | very accurate | small | very short | short |
| transient travels, whose driving behavior is close to the stationary or linear range, e.g. slalom maneuvers | inaccurate | large | very short | long |
| driving behaviors which are very far from the stationary or linear range, e.g. skidding maneuvers | cannot be represented | infinitely large (no monitoring) | infinitely long (no monitoring) | |

Figure 5:
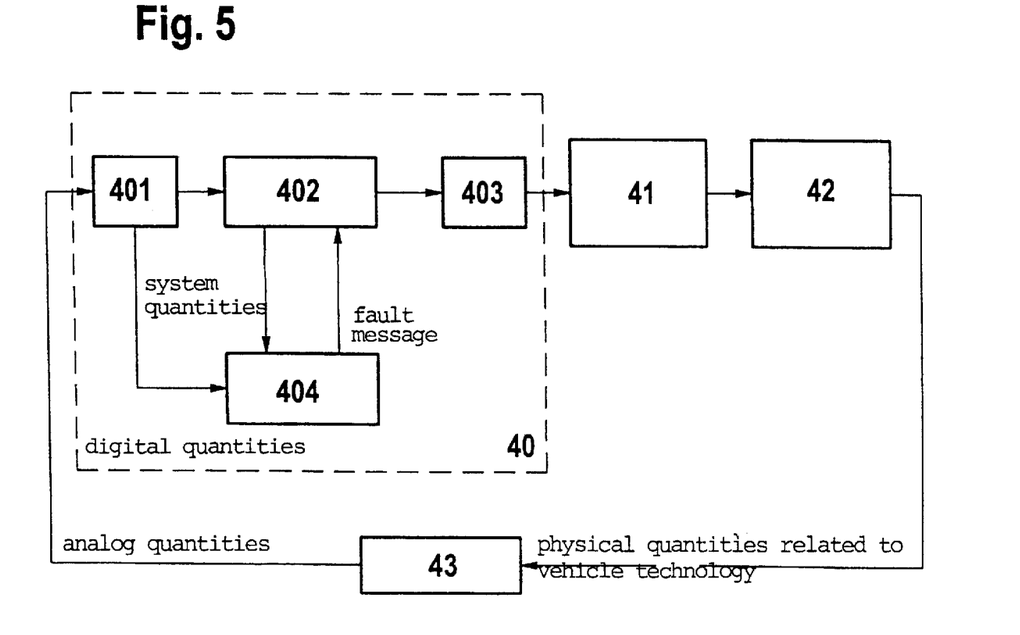
FIG. 5 is a block diagram of a sensor monitoring arrangement according to the present invention.

The structure of the hardware realization is illustrated in FIG. 5. This structure comprises a microprocessor system 40 having its output signals sent to a unit 41 for brake and engine intervention.

The microprocessor system 40 comprises an analog/digital converter 401 for the conversion of the analog sensor signals, and a digital control algorithm 402 which is connected thereto and to which a digital/analog converter 403 for the generation of the analog output signals is connected. The digital sensor signals are further sent to a monitoring system 404 to which also the system quantities produced by the digital control algorithm 402 are applied and which submits a fault message to this unit 402.

The ESP system which comprises both the digital control algorithm and the monitoring system is preferably programmed in C-language and subsequently implemented on the microprocessor system 40. The input signals of the microprocessor system 40 are the signals generated by the sensors 43 installed in the vehicle 42. The output signals of the microprocessor system 40 are the correcting variables which are sent for the control of the brake and engine management system 41. The monitoring system 404 operates in parallel to a control system, monitors the overall system and, therefore, does not influence the control when no faults are detected. When a fault is detected, the monitoring system 404 sends a fault message to the digital calculating algorithm 402 which hence deactivates the ESP system.

Figure 6:
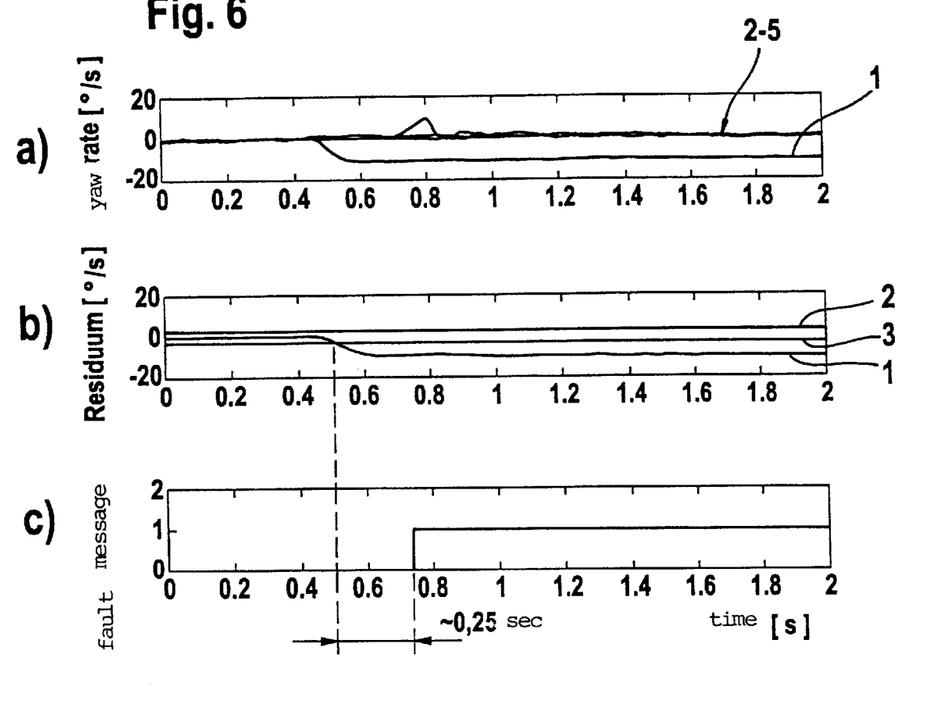

The monitoring system was tested in several driving tests. In FIGS. 6a, b, c, the measurement results of two road test runs are shown as an example, namely, the result of a fault simulation of the yaw rate sensor during straight travel. FIG. 6a shows the signal of the yaw rate sensor (line 1) and its four reproductions (lines 2 to 5). FIG. 6b shows the course of the residuum (line 1) and the threshold (lines 2 and 3). In FIG. 6c it is illustrated when a fault message is triggered.

It becomes apparent from these illustrations that the yaw rate can be described very precisely. The simulated fault was detected within 0.25 seconds before the yaw torque control applied high pressure to a wheel.

Figure 7:
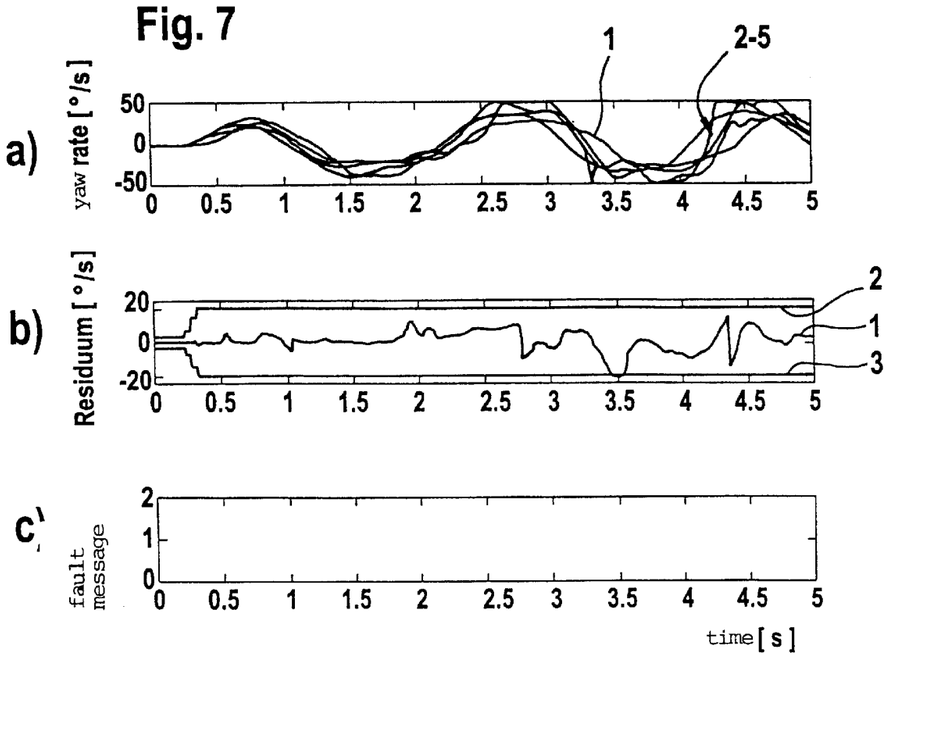

FIGS. 7a, b, c show the measurement results of monitoring the yaw rate sensor during a ride with a slalom maneuver. During such a slalom maneuver the yaw rate cannot be described accurately due to the phase shift between the sensor signal and the model signals. In these situations, a like model inaccuracy cannot be avoided generally when the model is produced. To prevent that a spurious alarm is triggered, the monitoring threshold will be increased at the beginning of the slalom movement already. FIG. 7a in turn shows the signal of the yaw rate sensor (line 1) and its four reproductions (lines 2 to 5). In FIG. 7b the course of the residuum (line 1) and the threshold (line 2 and 3) is shown, while it can be gathered from FIG. 7c that no fault message was triggered.

In total, a method and a device for sensor monitoring in an ESP system is described wherein the essence is a generation of residua based on a multi-process model, the development of which is in first place effected in consideration of driving dynamics and the practical implementability and applicability. Sensor faults and especially those with a great gradient can be detected during driving by way of sensor monitoring operations. The monitoring system offers a high rate of reliability because it exhibits a high degree of robustness vis-à-vis model inaccuracies, on the one hand, and a great sensitivity to sensor faults, on the other hand.

What is claimed is:

1. Method of monitoring a plurality of vehicle sensors which sense respectively associated reference variables or measured variables relating to a driving-dynamics process, comprising the steps of:

monitoring the course of an output signal from each vehicle sensor in said the plurality of vehicle sensors wherein said monitoring is conducted in a cyclical and sequential manner, providing analytical redundancies for the process reference variables or process measured variables being monitored from currently non-monitored process reference variables and/or process measured variables of a current process on the basis of a multi-process model for a normal operational mode, producing residua by subtraction of the provided redundant analytical redundancies from the process reference variable or process measured variable being currently monitored, evaluating the residua by means of a residua evaluating function, and comparing the evaluated residuum with a predetermined threshold value and producing an error message when the residuum reaches the threshold value for at least one predetermined monitoring time.

2. Method as claimed in claim 1, wherein at least one of reference variables and measured variables is a yaw rate, a transverse acceleration, or a steering angle.

3. Method as claimed in claim 2, wherein the method runs in parallel to a electronic driving stability program and deactivates the driving stability program when the fault message is generated.

4. Method as claimed in claim 1, wherein the multi-process model is formed from a number of partial models, by means of which the process reference variable or process measured variable being respectively monitored is reproduced on the basis of physical interrelationships of other physical quantities.

5. Method as claimed in claim 1, wherein the residua evaluating function in a transient process condition distinguished by a high rate of model inaccuracy is produced by an algorithm according to a 'minimum of all' principle, wherein the smallest of all residua produced is compared with the threshold value, and wherein in a stationary process condition, the residua evaluating function is distinguished by a low rate of model inaccuracy, wherein an algorithm according to a 'majority principle' is provided, wherein a mean value of the analytical redundancies is formed, and that analytical redundancy is used for producing the residuum to be compared with the threshold value which is the medium value of three redundancies with the least discrepancies from the mean value.

6. Method as claimed in claim 5, wherein in the case where the number of the valid models is smaller than three, the residuum is produced according to the principle 'minimum of all' and, in all other respects, the residuum is produced according to the 'majority principle'.

7. Method as claimed in claim 1, further including the step of:

calculating and adapting the threshold values in dependence on a process condition by way of the process reference variables and process measured variables not being monitored and the wheel rotational speeds and the vehicle speed, wherein when a fault message is triggered when an unplausible sensor signal appears or a spurious fault message appears due to high rate of model inaccuracy.

8. Method as claimed in claim 1 of the output signals is conducted using monitoring times that are conformed adaptively to the current process condition and selected such that a brief failure of a sensor is tolerated.

9. Device for monitoring vehicle sensors which sense individual reference variables or measured variables relating to a driving-dynamics process, comprising:

- a first device for calculating analytical redundancies for a currently monitored process reference variable or process measured variable from currently unmonitored process reference variables or process measured variables of a current process by means of a multi-process model for a normal operational mode,
- a second device for producing residua by subtraction of the calculated, redundant analytical redundancies from the currently monitored process reference variables or process measured variable,
- a third device for evaluating the residua with a residua evaluating function,
- a fourth device for producing a threshold value, and
- a fifth device for comparing the evaluated residuum with the threshold value and for producing an error message when the residuum reaches the threshold value for at least one predetermined monitoring time.

* * * * *